United States Patent [19]
White et al.

[11] Patent Number: 5,127,744
[45] Date of Patent: Jul. 7, 1992

[54] SELF-ACTING AIR BEARING SPINDLE FOR DISK DRIVE

[75] Inventors: Norman J. White, Kinross; Ronald W. Woolley, Poole, both of United Kingdom

[73] Assignee: Rodime PLC, Scotland

[21] Appl. No.: 501,807

[22] Filed: Mar. 30, 1990

[30] Foreign Application Priority Data

May 12, 1989 [GB] United Kingdom ............... 8910940

[51] Int. Cl.$^5$ ............................................. F16C 32/06
[52] U.S. Cl. .................................... 384/112; 384/107
[58] Field of Search ............... 384/100, 107, 111–113, 384/114, 121, 123, 133, 226, 227, 228, 907.1

[56] References Cited

U.S. PATENT DOCUMENTS

| | | |
|---|---|---|
| 2,899,243 | 8/1959 | Acterman . |
| 3,146,036 | 8/1964 | Benatti ............................... 384/113 |
| 3,726,572 | 4/1973 | Beardmore ......................... 384/113 |
| 3,870,382 | 3/1975 | Reinhoudt . |
| 3,950,039 | 4/1976 | Huber et al. ....................... 384/112 |
| 4,007,974 | 2/1977 | Huber . |
| 4,200,344 | 4/1980 | Binns et al. ........................ 384/107 |
| 4,487,514 | 12/1984 | Mori ................................... 384/113 |
| 4,547,081 | 10/1985 | Tanaka et al. ..................... 384/107 |
| 4,656,545 | 4/1987 | Kakuta ................................ 360/98 |
| 4,678,348 | 7/1987 | Tielemans et al. ................. 384/114 |
| 4,694,213 | 9/1987 | Gowda et al. ................. 384/133 X |
| 4,696,584 | 9/1987 | Tielemans ......................... 384/107 |
| 4,699,525 | 10/1987 | Mizobuchi et al. ................ 384/369 |
| 4,789,476 | 1/1989 | Sakatani et al. ................... 384/108 |

OTHER PUBLICATIONS

G. Bouchard et al., "Nonrepeatable Runout of 5¼ Disk File Spindles", *IBM Technical Report*, Jun. 1986, pp. 1–33.

"Self-Energized Air-Bearing Spindle in a Disk Drive Motor", *IBM Technical Disclosure Bulletin*, vol. 29, No. 5, Oct. 1986, pp. 223 and 2234.

"Ebara Engineering Review" article: *Spiral Groove Ceramic Bearings and Their Application to Products*, by Noriyuki Osada and Toshiya Kanomori, Apr. 1989.

*Primary Examiner*—Thomas R. Hannon
*Attorney, Agent, or Firm*—Mason, Fenwick & Lawrence

[57] ABSTRACT

A spindle assembly with air bearings for use in a hard disk storage device. The spindle assembly consists of a stationary shaft assembly and a rotating hub assembly that is supported in rotation by self-acting air bearings formed between adjacent axial and radial surfaces of the shaft assembly and the hub assembly. The shaft assembly includes a stationary shaft. A cylindrically hollow ceramic sleeve is fitted around the shaft. A double herringbone groove pattern is indented into the outer cylindrical surface of the sleeve. A further hollow ceramic cylinder fits over the sleeve such that a suitable air bearing can develop between the outer surface of the sleeve and an inner surface defined in the cylinder. Two disk-shaped ceramic thrust plates are fitted around the shaft, one on either side of the hollow sleeve. The innermost surfaces of the thrust plates are indented with a herringbone groove pattern such that a suitable air bearing can develop between the surface of the thrust plates and the flat end surfaces of the cylinder. A motor stator assembly is fitted to the end of the stationary shaft beyond one of the thrust plates, and a magnetic rotor assembly is fitted to the inside surface of a rotating aluminum hub adjacent to the stator.

12 Claims, 2 Drawing Sheets

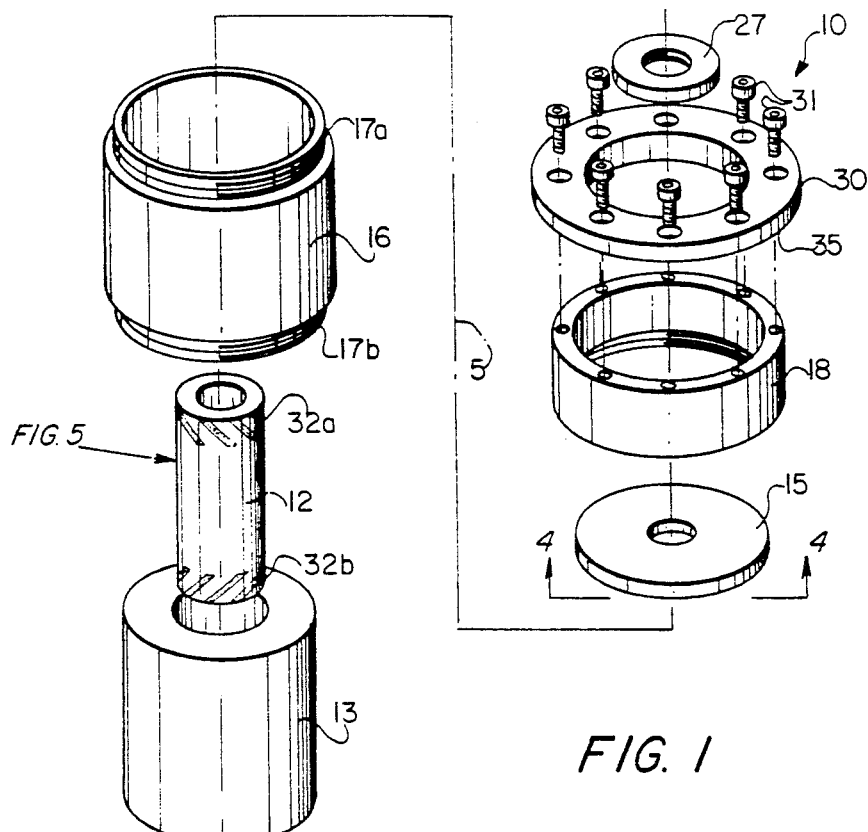
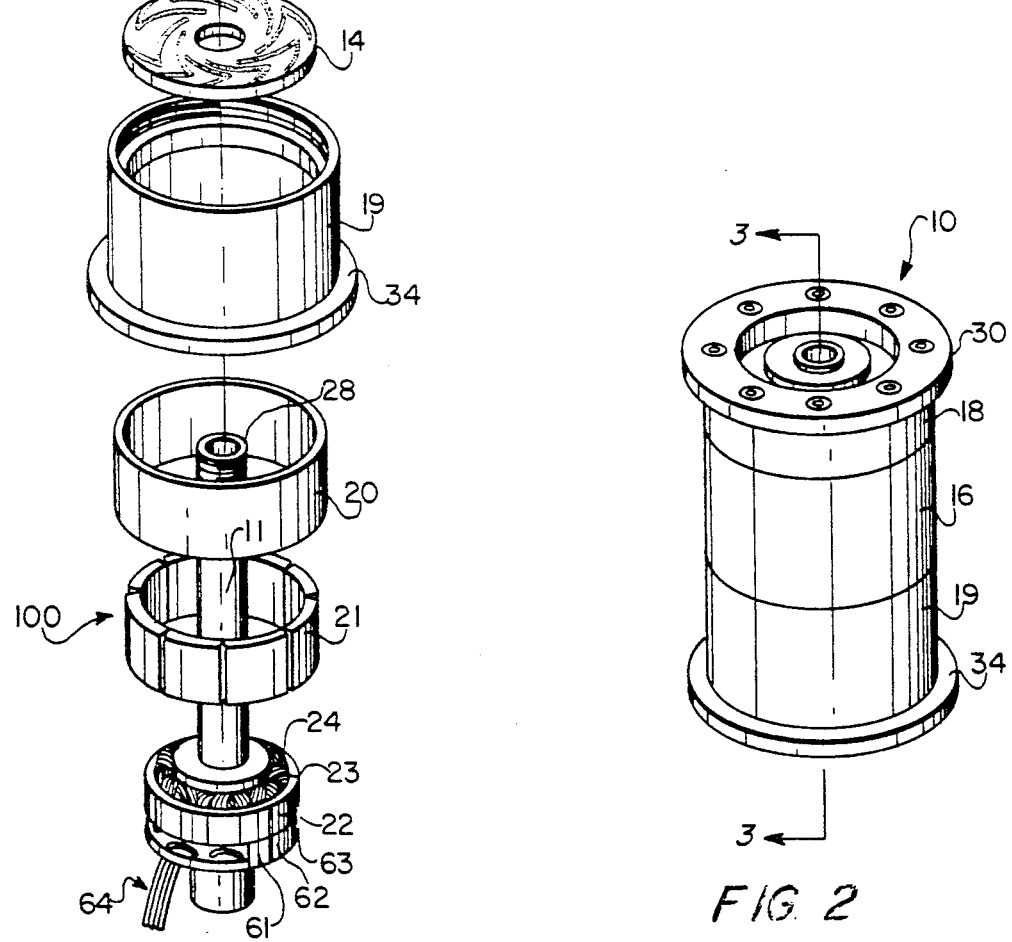
FIG. 1
FIG. 2

SELF-ACTING AIR BEARING SPINDLE FOR DISK DRIVE

FIELD OF THE INVENTION

The present invention relates to motorized spindles used for supporting and rotating magnetic disks in a data storage disk drive.

BACKGROUND OF THE INVENTION

The storage capacity and general performance of hard disk drives have improved steadily over the last decade in response to the increasing demands of the computer industry, logically evolving from mainframe to mini to work station to personal computer. These developments have been mainly fueled by corresponding advances in the components of magnetic recording technology and in electronic sophistication and miniaturization. In particular, magnetic read/write recording heads and disks are capable of supporting areal data storage densities typically ten times greater than they could ten years ago. This is being achieved by higher track densities, higher linear flux transition densities and lower recording head flying heights. The point is now being reached, however, where further advances are likely to be impeded by mechanical constraints. In particular, limitations will result from the spindle hub holding the stack of disks on account of the properties of the ball bearing assemblies used for rotational support. Random vibrations in both axial and radial axes ultimately lead to limitations in positioning accuracies and signal-to-noise ratios with consequences for storage capacities. The radial accuracy directly limits the number of concentric tracks on a disk on which data can be stored and reliably retrieved.

Design choices of ball bearing parameters such as type, pre-load, location, grease, etc., must also take aging into account. The deterioration with time and usage of ball bearings tends to degrade spindle performance. In addition, spindle frequency response variations, normally a function of rotational speed, number and quality of balls comprising the bearings, etc., must be reduced over the lifetime of the spindle since they are likely to contribute to positioning inaccuracies. Other consequences of the continued use of ball bearing-based spindles in very high performance disk drives include acoustic noise and relatively high power requirements.

The present invention is based on the technology of fluid films used to separate and support moving surfaces such that motion and load bearing may be achieved with great accuracy and consistency, with the minimum of influence from other factors. Typically, a fluid-film bearing is an anti-friction bearing in which rubbing surfaces are kept apart by a film of lubricant such as oil.

Devices which generate pressure by virtue of relative motion between surfaces are defined as being hydrodynamic or self-acting. Those which rely on an external source of pressure are called hydrostatic or pressurized systems. The latter have been used for many years in a wide variety of applications including, for example, machine tools. The self-acting bearing has the huge advantage of being self-contained with no requirement for external connection or supply, but puts much tighter constraints on design in order to generate adequate pressure. An example of this, used for many years in a disk drive itself, is the "flying" read/write head on the rotating, rigid disk. The typical head has a suitably contoured air bearing surface which permits it to take-off as the underlying disk begins to rotate and finally establish a stable flying position, e.g., 10 to 20 microinches above the surface, being supported by a relatively stiff air bearing acting against a mechanical spring. It should also be noted that self-acting, air bearing spindles have been, and are being, used in the disk drive industry in certain items of manufacturing and test equipment, where high accuracy is mandatory, such as servo track writers.

U.S. Pat. No. 4,200,344 (Binns et al) discloses a disk drive spindle employing a uni-directional, self-acting air bearing. The spindle operates with its axis vertical and uses an alternating current (AC) synchronous motor for rotation. The spindle load, however, is supported by a self-acting bearing using recirculating oil. In use, a disk pack containing up to 11 disks would be attached to the spindle with a combined rotating load of 50 pounds.

U.S. Pat. No. 4,487,514 (Mori) discloses a self-acting air bearing spindle without separate thrust air bearings and driven by an external motor.

*IBM Technical Disclosure Bulletin*, Vol. 29, No. 5 (1986), shows part of a spindle of a drive motor, to which recording disks could be attached. The spindle is supported radially by a self-acting air bearing and axially by a thrust bearing operating by means of a negative pressure air bearing.

An article entitled "Statistical methods reveal runout anomalies of disk spindles," by Bouchard et al, *Computer Technology Review*, No. 32, pages 32 and 33 (January 1987), is useful in that it presents results of experiments to measure and compare the non-repeatable runout of disk spindles based on ball bearings, ferro-fluid bearings and air bearings.

There is thus a need for an improved motorized spindle assembly which can enable a new generation of disk storage products. The present invention fills that need by providing a self-acting, air bearing motorized spindle in a form-factor which allows it to directly replace standard ball bearing spindles in 8" and full height 5¼" rigid disk drives. The advantages of the present invention stem from the total absence of ball bearings, raceways, cages, pre-loads, etc., and their replacement by self-generating air bearings in both axial and radial axes. This results in almost unmeasurable vibration and random run-out, since the air bearings are effectively self-aligning, operate silently and are extremely reliable. There is effectively no wear. This smoothness of operation with consequent high accuracy is achieved by virtue of the averaging action of the air film which reduces the influence of geometric errors in the component surfaces, a situation contrasting directly with rolling contact found in ball bearings. The air bearing configuration chosen in a preferred embodiment of the present invention is a self-acting, inward pumping, herringbone groove-type which provides radial accuracies, when running at the appropriate design speed, at least several times better than the machining tolerance errors of the bearing surfaces supporting the high pressure film.

There are other advantages of the present invention over prior art devices which should be pointed out. The simplicity of the spindle in terms of the relatively small number of parts, consequent ease of assembly and self-aligning capability in operation imply that manufacturing costs in reasonably high volumes can be low, provided appropriate dedicated machine tools are utilized. Also, a primary feature of a preferred embodiment of the present invention is that the spindle is of the "in-hub" motor-type and externally indistinguishable from conventional bal bearing disk drive spindles. This is an important objective of the invention since it clearly enables ease of integration into the current designs and form-factors of the disk drive industry.

SUMMARY OF THE PRESENT INVENTION

An object of the present invention is to provide disk support and drive means for a data storage disk drive whereby higher capacity and performance are achieved.

Another object of the present invention is to provide a spindle assembly employing self-acting air bearings for achieving a high degree of positioning accuracy, reliability, stiffness, quietness, low power and start-stop performance.

Yet another object of the present invention is to incorporate, within the overall axial dimension of the disk-support hub of the spindle and at one end of the spindle axis, a motor for driving the spindle from rest to its operating rotational speed, the motor comprising a fixed stator assembly and a magnet rotor assembly attached to the inner surface of the spindle hub.

Still another object of the present invention is to provide a spindle assembly that satisfactorily operates in orientations with the spindle axis horizontal as well as vertical.

A further object of the invention is to provide such a motorized air bearing spindle with physical dimensions which permit direct incorporation into existing standard disk drive form-factors, including at least 8" and 5¼" disk drives.

The present invention in a particular embodiment essentially comprises a motorized spindle assembly suitable for use in a hard disk computer storage device. The spindle assembly generally consists of a stationary shaft assembly and a rotating hub assembly. The hub assembly is configured to receive a stack of data storage disks. The hub assembly is supported in rotation by self-acting air bearings formed between adjacent axial and radial surfaces of the shaft assembly and the hub assembly.

The shaft assembly includes a stationary shaft with an external thread at one end. A cylindrically hollow ceramic sleeve of length less than the shaft is fitted co-axially around the shaft. A double helical groove pattern is indented into the outer cylindrical surface of the sleeve. A further hollow, ceramic cylinder of length slightly less than that of the sleeve forms part of the hub assembly and fits co-axially over the sleeve with minimal clearance such that a suitable air bearing can develop between the outer surface of the sleeve and an inner surface defined in the cylinder when the sleeve and cylinder rotate relative to each other.

Two ceramic thrust plates each in the form of an annular disk or annulus are fitted around the shaft, one on either side of the hollow sleeve. The innermost facing surfaces of the thrust plates are indented with a herringbone groove pattern such that a suitable air bearing can develop between the surfaces of the thrust plates and the flat end surfaces of the cylinder when the cylinder rotates relative to the thrust plates. An aluminum hub longer than the ceramic cylinder is shrunk co-axially on to it to define the hub assembly. A motor stator assembly is fitted to the end of the stationary shaft beyond one of the thrust plates, and a magnetic rotor assembly is fitted to the inside surface of the rotating aluminum hub adjacent to the stator such that, in combination, the stator and rotor provide rotation to the whole assembly, thus establishing the radial and axial air bearings.

In order to meet the performance potential of the spindle, lapping operations to ensure clean, finely polished surfaces are required on the outer surface and end faces of the sleeve, on the bore and end faces of the cylinder, on both faces of the "central" thrust plate and on the inner face of the other thrust plate. Ceramic (alumina oxide) is chosen as the bearing material for a number of reasons, including low mass density, chemical inertness and, important from a start/stop point of view, high surface hardness. Suitable ceramics include those sold under the name Sintox, which is made by Lodge Ceramics, Ltd., Rugby, England, or Hilox, which is made by Morgan Matroc, Ltd., Stourport-on-Severn, England. The stator/rotor unit used to power the spindle assembly is geometrically constrained to fit in a space provided within the hub and provide adequate torque for start-up and steady-state control.

BRIEF DESCRIPTION OF THE DRAWINGS

FIG. 1 is an exploded perspective view of a disk drive spindle embodying the teachings of the present invention.

FIG. 2 is an assembled perspective view of the embodiment of FIG. 1.

DETAILED DESCRIPTION OF THE PREFERRED EMBODIMENTS

Figures 3, 4, 5:
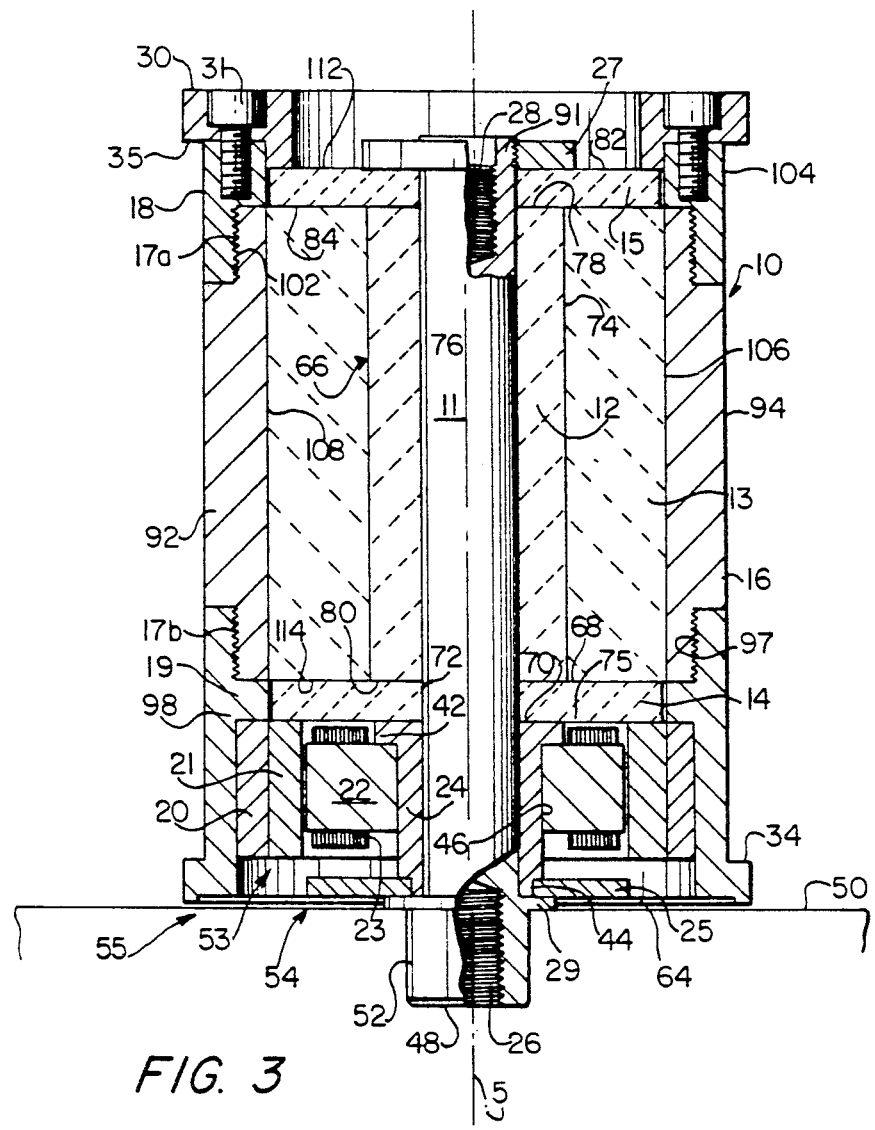
FIG. 3 is a cross-sectional view taken along lines 3—3 of FIG. 2.
FIG. 4 is a view of the inner facing surface of the uppermost of two thrust plates forming part of the embodiment of FIG. 1, showing the groove arrangement formed thereon for the thrust (axial) bearing, the groove arrangement of the other, lowermost plate being a mirror image of that of the upper plate when both plates are viewed side by side.
FIG. 5 is a side view of a sleeve forming part of the embodiment of FIG. 1, showing the groove arrangement formed thereon for the journal (radial) bearing.

In describing the preferred embodiments of the subject invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Referring to FIGS. 1 through 3, the motorized spindle assembly 10 is seen to comprise several component parts. The bearing takes the shape of an "H-form" made up of ceramic thrust plate 14 and 15, and ceramic sleeve 12, which fits around a central stationary shaft 11. These bearing parts are kept tight and co-axial with the centerline or longitudinal axis 5 of the shaft to typically 0.001" by means of locking nut 27 and stator bush 24 located against shoulder 29 of shaft 11 (FIG. 3). The rotating elements consist primarily of ceramic cylinder 13 to whose outer cylindrical surface 106 has been heat-shrunk aluminum hub 16. The active bearing surfaces are the outer cylindrical or lateral lapped surface 74 of sleeve 12 in conjunction with inner bore lapped surface 110 of cylinder 13, generating the radial (journal) bearing, and the inner faces 68 and 84 of thrust plates 14 and 15, respectively, acting in conjunction with the lapped end faces 112 and 114 of cylinder 13, generating the axial (thrust) bearing. Towards the ends of center hub section 16 are cut micrometer or fine threads 17a and 17b to which are attached upper and lower hub extension rings 18 and 19. On the inner bore of extension ring 19 is fixed magnetic rotor assembly 53 consisting of back iron 20 and magnet 21. The complementary stator assembly 54, consisting primarily of back bushing 24, iron yoke 22, windings 23 and printed circuit board 25, all fixed to shaft 11. Optional tapped holes 26 and 28 are shown in each end of the shaft for fixing within a housing (not shown). Also shown is a typical disk stack clamping ring 30 attached to hub extension ring 18 by screws 31.

Referring to FIG. 5, there are two sets of helical grooves 32a and 32b shown which provide not only radial stiffness to the bearing, but also give a degree of angular stiffness which is augmented by the contribution of the thrust bearings. FIG. 4 shows the corresponding herringbone pattern 33 on the inner faces of the thrust plates. The radial and thrust grooves 32 and 33 have a depth in the range of from approximately 30 microinches to about 90 microinches with approximately 50 microinches being preferred, and can be formed using a template in a known conventional manner by either molecular ion beam bombardment in a vacuum chamber or by powder blasting. The total (axial) length of the journal bearing is approximately 1.5" and the annular dimension (R) of the thrust bearing is about 0.626".

Having presented the general particulars of a preferred embodiment of the present invention, a more detailed description of the structure of the invention follows. At the heart of the spindle assembly 10 is the central stationary shaft 11. As oriented in FIG. 3, the bottom of shaft 11 passes through the stator bushing 24. The top of the bushing contains a radially extending flange portion 42 whereas the bottom rim of the bushing contains an indentation 44 that circumscribes the outer cylindrical surface 46 of the bushing. The bottom of the shaft 11 terminates in a planar end face 48 within which is defined the longitudinally extending threaded bore 26. The bottom end of the shaft contains a cylindrical portion 52 which is of slightly larger diameter than the diameter of the main part of shaft 11. Portion 52 is sized to be received within a mounting hole found in the support base 50 of a hard disk drive unit. In order to limit the extent to which portion 52 of shaft 11 may be inserted into the bore of support base 50, the upper part of portion 52 terminates in the radially extending flange or shoulder 29. The bottom of flange 29 is located relative to the support base so that the bottom of hub 90 is a predetermined distance away from base 50 to allow free rotation of the hub.

The space defined along shaft 11 between flanges 42 and 29 provides room within which to mount the stator assembly 54 of the drive motor 55. As shown in FIGS. 1 and 3, the arm yoke 22 is mounted to bushing 24, and secured by bonding. Windings 23 are then placed on the arm yoke in order to complete the stator portion of the motor. In a preferred embodiment, the stator construction consists of three phases and eight poles with the windings being wound in a delta configuration.

Positioned and supported on the indentation 44 to be held in place by shoulder 29 is the printed circuit board 25 which provides the circuitry to interconnect the stator windings, as well as three Hall effect transducers 61 through 63 with appropriate leads 64 for connection to the electronic circuitry of the hard drive unit, thus creating a brushless motor.

The Hall effect devices 61-63 are used to sense the position of the rotor 53 as it turns, and hence, signal when the windings 23 should be energized, i.e., provide the commutation signals. This is one Hall element per phase (winding). This technique is widely used for brushless motors, in general, and, in a direct sense, the Hall elements replace the carbon brushes commonly used in regular motors. However, it is possible to regulate the rotational speed of a brushless motor by means other than Hall elements. For example, in a disk drive, equivalent signals could be derived from a servo surface. Thus, it can be appreciated that other conventional method may be employed to control the rotational speed of the motor.

Positioned along shaft 11 is the H-form bearing 66 which consists of three components, namely, the two ceramic thrust plates 14 and 15 and the ceramic sleeve 12. The two thrust plates 14 and 15 in a preferred embodiment are the same size. Each of the thrust plates is made of a ceramic in the form of an annulus of predetermined thickness. As oriented in FIG. 3 thrust plate 14 contains top planar surface 68 and bottom planar surface 70. These surfaces are essentially parallel to each other and spaced a predetermined distance corresponding to the thickness of plate 14, which is approximately 0.1565". The spaced surfaces are preferably flat lapped. Defined at the central portion of annulus 14 is a cylindrically shaped bore 72 which extends through the axis of the annulus. Thrust plate 14 has its bottom surface 70 set in intimate contact with the upper planar surface 75 of flange 42.

With reference to FIGS. 1 and 4, the top surface 68 of thrust plate 14 contains grooves arranged in a herringbone pattern, the grooves being of identical shape to the grooves 33 of plate 15 (FIG. 4), but being a mirror image thereof.

The ceramic sleeve 12 includes an outer cylindrical surface 74 and an inner cylindrical surface 76. These surfaces are essentially parallel to each other and are defined so that their longitudinal axes correspond to the longitudinal axis 5 of central shaft 11. As oriented in FIG. 3, sleeve 12 terminates at its upper portion in a top planar surface 78 and at its bottom portion in a bottom planar surface 80. The diameter of inner cylindrical surface 76, which is approximately 0.3145", is chosen so that the sleeve may be slid into position on shaft The sleeve is positioned on shaft so that bottom surface 80 is in intimate contact with a portion of top surface 68 of thrust plate 14.

With reference to FIGS. 1 and 5, the outer cylindrical or lateral surface 74 of sleeve 12 contains two sets of spaced helical grooves 32a and 32b. Groove 32a is positioned along the portion of cylindrical surface 74 near the rim defined by upper surface 78. In the same way, grooves 32b are positioned along the cylindrical surface 74 near the rim defined by bottom surface 80. The diameter of the cylindrical surface 74 is approximately 0.6249".

The H-form bearing is completed with the upper thrust plate 15 which has the same configuration and structure as the bottom thrust plate 14. As shown in FIG. 3, thrust plate 15 has an upper planar surface 82 and a bottom planar surface 84. Thrust plate 15 is positioned on shaft 11 so that the bottom surface 84 is in intimate contact with a portion of the top surface 78 of sleeve 12. The bottom planar surface 84 contains a groove arrangement 33 similar to that found on the top surface 68 of thrust plate 14. However, the direction of the herringbone pattern on thrust plate 15 is facing in the opposite direction from that found on thrust plate 14.

The H-form structure is completed by securing locking nut 27 onto the upper threaded end 91 of shaft 11. The nut is rotated in order to compress the two thrust plates and ceramic sleeve against the upper surface 70 of flange 42 in order to immobilize the two thrust plates and the ceramic cylinder relative to shaft 11 and relative to each other.

With the completion of the description of the inner stationary structure of the spindle assembly, the details of the outer rotating hub structure will now be described.

The rotating hub 90 basically comprises a hollow cylindrical hub 92 within which is fixably secured the ceramic cylinder 13.

The aluminum hub 92 actually consists of three separate pieces: the central hub 16, the upper hub extension ring 18, and the lower hub extension ring 19. As can be seen in FIG. 3, the central aluminum hub 16 contains upper and lower threaded portions 17a and 17b of lesser diameter than the diameter of the cylindrical outer surface 94 of ring 16. Lower ring 19 contains an outer cylindrical surface 96. The top portion of lower ring 19 is provided with an interior threaded portion 97 which mates with threads 17b so that when lower ring 19 is engaged with central ring 16, and subjected to a machining operation, a smooth lateral surface is provided between cylindrical surface 94 and cylindrical surface 96. Positioned adjacent to but below interior threads 97 is an inwardly extending radial ledge 98. The diameter of the ledge is chosen so that it does not interfere with the outer diameter of thrust plate 14. Positioned below ledge 98 and secured to the interior cylindrical portion of lower ring 19 is the back iron 20 to which are secured a series of magnets 21 arranged to define a cylindrical ring 100 that aligns with the stator windings 23 of stator assembly 54. Back iron 20, in the form of a cylindrical ring, and the magnets 22 constitute the magnetic rotor assembly 53 for the motor used to rotate the hub 90 relative to the shaft 11. As viewed from the top, the hub rotates in a counter-clockwise direction.

The upper extension ring 18 contains a threaded interior portion 102 located at the lower part of ring 18. The threaded portion 102 is sized to mate with threaded portion 17a of intermediate ring 16. When upper ring 18 is threadably engaged with lower ring 16, and subjected to a machining operation, a smooth lateral surface is defined between cylindrical surface 94 of ring 16 and outer cylindrical surface 104 of ring 18.

As oriented in FIG. 3, the bottom of lower extension ring 19 terminates in the radially extending mounting flange 34. In the same way, the top of upper ring 18 receives the disk shape clamping ring 30 which when secured to ring 18 through a series of fasteners such as screws 31 defines the flange 35 which together with flange 34 is used to mount a disk stack to the hub 90. During manufacture, the three rings 16, 18 and 19 are in threaded engagement with each other before they are subjected to the machining operation on a lathe to create the smooth lateral surface.

Completing the hub assembly is the ceramic cylinder 13 which contains an outer cylindrical surface 106 that is in intimate contact with and fixed relative to the inner cylindrical surface 108 of hub 90. The ceramic cylinder also includes an inner cylindrical surface 110 and terminates at one end in a top planar surface 112 and at the other end in a bottom planar surface 114. Surfaces 112 and 114 are essentially parallel and spaced from each other. At the same time, inner cylindrical surface 110 is parallel to and spaced from outer cylindrical surface 108 with both of the surfaces being oriented so that their axes correspond to the longitudinal axis 5 of shaft 11. The ceramic cylinder 13 has an inner cylindrical diameter that is slightly greater than the outer cylindrical diameter 74 of sleeve 12 to allow the ceramic cylinder 13 to freely move relative to sleeve 12. At the same time, the distance between planar surfaces 112 and 114 of ceramic cylinder 13 is slightly less than the distance between surface 84 of thrust plate 15 and surface 68 of thrust plate 14, thus further allowing freedom of relative movement between ceramic cylinder 13 and ceramic sleeve 12 and thrust plates 14 and 15.

The bearing surfaces are lapped to dimensions which provide typically 0.0004" total axial clearance and 0.0002" total diametral clearance. The attainment of these values is much facilitated by the artifice of separating the outer aluminum hub into three parts 16, 18 and 19 since this permits easy squaring and lapping of the end faces of ceramic cylinder 13. The outer diameter of the hub 90 is machined to create a smooth lateral surface following assembly of its parts 16, 18 and 19. In operation, DC current is supplied via leads 64 to the windings 23 of the stator causing the rotor 53, and hub assembly to rotate. Radial and axial air bearings are rapidly established, and when the desired running speed is reached, for example 3600 rpm, bearing performance parameters such as stiffness achieve their required values and the running clearances are determined. The latter would be typically 0.0002" between thrust plates 14 and 15, and cylinder 13 end faces 112 and 114 when the spin axis 5 is horizontal and 0.0001" between outer surface 74 of the sleeve 12 and bore surface 110 of the cylinder 13. When the spin axis 5 is vertical, the running axial clearances depend on the load. Although in the preferred embodiment, a hub rotation speed of 3600 rpm is specified, it is contemplated that the speed may take on any value with a range of approximately 3000 to 6000 rpm being preferred.

An important feature of the present invention concerns the dimensions of the spindle assembly 10. The constraints of the standard 5¼" disk drive form-factor require that the diameter of the hub 90 be accurately 40 mm (1.5748") and the overall length of the hub, between mounting flange 34 and the undersurface 35 of disk clamp ring 30 be approximately 57 mm (2.2441"). This in turn implies that the ratio of length to diameter of the radial air bearing is relatively large. To achieve low speed separation, particularly with regard to the thrust bearing, the flatness and squareness geometry of the thrust plates has to be maintained to within 5 microinches on each face. Again, this is made much easier by splitting the hub into sections 16, 18 and 19 which also allows ease of inspection and matching of parts. Under conditions of large scale manufacture using dedicated machine tools, the precision machining of the bearing surfaces should thus be considerably simplified and, thus, relatively inexpensive. The thrust bearing faces, at least, should have a surface quality finish of the order of 2 microinches centerline average.

The performance of the thrust bearings at start-up is he spin axis vertical condition (stator end downward) with an estimated total load (rotor and disks) of 1.5 pounds, a "lift-off" gap of 15 microinches is established at 60 rpm. This gap increases to 70 microinches at 3600 rpm with related bearing stiffness of approximately 60,000 pounds per inch and power consumption of 0.15 watts. The bearing stiffness in this axial direction is load dependent and highly non-linear. For example, in the spin axis horizontal direction, the static load is zero and the stiffness is consequently of the order of 1000 pounds per inch. However, the stiffness increases dramatically with applied load. With the spin axis 5 horizontal for an applied horizontal acceleration of 5 g, the stiffness would reach around 750,000 pounds per inch at a deflection of 160 microinches. This axial response is adequate for a typical disk drive application.

In contrast, the performance of the journal bearing is largely independent of orientation. When the spindle is balanced with zero radial load force, the stiffness at 3600 rpm is around 150,000 pounds per inch and, in contrast to the thrust bearing, remains reasonably constant with increasing deflection up to about half of the radial clearance. Hence, a 5 g radial acceleration on a rotor load of 1.5 pounds would give a deflection of 50 microinches. Lift-off speed and power absorbed at 3600 rpm are essentially the same for both journal and thrust bearings. The bearings, as defined here, in terms of geometry, configuration and surface finish, ensure that at switch-off, touch-down is achieved at speeds no greater than 200 rpm and this further leads to a capability for the loaded spindle to meet a minimum of 15,000 start/stop cycles without deterioration in performance. An extremely important feature and natural consequence of the air bearing spindle, as described, is that of negligible random (or non-repeatable) run-out of the rotating hub. In operation, the rotating surfaces do not touch and are separated by air bearings of relatively high stiffness. A averaging of the surface separation takes place and this results in extremely stable air bearing dimensions. Typically, random radial run-outs of less than 2 microinches are measured.

The relative geometry and absolute size of the "H-form" spindle of FIG. 1 may be varied. In particular, increasing the diameter of the hub 90 to 100 mm (3.9370"), while leaving the overall length approximately as before, allows the spindle to be used for a typical 8 inch disk drive application. Here there is a considerable increase in the areas of the relative bearing surfaces with corresponding changes in performance. The axial stiffness and power at 3600 rpm nominally double for the same running clearance and the touch-down speed drops to below approximately 50 rpm. Also, the radial stiffness of the journal bearing increases by at least a factor of three. Other relative geometries may be constructed around the same basic invention.

From the above, it is apparent that many modifications and variations of the present invention are possible in light of the above teachings. For example, it is contemplated that the air bearing gap between the outer cylindrical surface 74 of the inner sleeve 12 and the inner surface 110 of the outer cylinder 13 can be between approximately 150 to 250 microinches of total clearance. Likewise, the air bearing gap between the inner facing surfaces 68 and 84 of the end plates 14 and 15 and the end surfaces 112 and 114 of the outer cylinder 13 measures between approximately 300 and 500 microinches of total clearance. Likewise, it is assumed that during assembly of the spindle bearing, established cleansing techniques, such as ultrasound, use of detergent, use of acetone, warm air drying, alcohol wipe, dry wipe and freon spray, will be employed to ensure that all parts properly mate. It is therefore to be understood that, within the scope of the appended claims, the invention may be practiced otherwise than as specifically described.

What is claimed is:

1. A spindle assembly for use in a disk drive unit having a support base, said spindle assembly comprising:
    hollow hub means having an outer surface adapted to receive a stack of data storage disks and an interior volume;
    shaft means for rotatably supporting said hollow hub means, said shaft means including an elongated shaft, an inner cylindrical sleeve fitted around said shaft and concentric with it, said inner sleeve including a cylindrical outer surface defining an axial surface of said shaft means, first and second annular end plates of radial dimension exceeding the radial dimension of said inner sleeve, said first and second end plates fitted around said shaft and concentric with it at either ends of said inner sleeve, said radial surfaces of said shaft means being defined on said first and second end plates, and fastening means for holding said shaft, said inner sleeve, and the first and second end plates in a fixed relationship;
    said hollow hub means including a hollow rotatable hub, a hollow outer cylinder fixedly secured within said hollow hub, said outer cylinder including an inner cylindrical surface defining an axial surface of said hub means, said outer cylinder including first and second end surfaces, each defining one of two radial surfaces, and means for arranging said hub means in registration with said shaft means so that said radial and first and second axial surfaces of said outer cylinder are aligned respectively with said radial and first and second axial surfaces of said inner sleeve, and separated by small gaps;
    means for fixedly securing said shaft means to said support base; and
    bearing means defined within said volume and the axial and radial surfaces of said shaft means for creating air bearings between corresponding axial and radial surfaces of said hub means and said shaft means as said hub means rotates relative to said shaft means, said bearing means including a first herringbone groove pattern on said first radial surface of said first end plate, a second herringbone groove pattern on said second radial surface of said second end plate, and a double helical groove pattern on said axial surface of said inner sleeve, such that during rotation of said hub means, a journal air bearing develops between said double helical groove pattern surface and said axial surface of said outer cylinder and thrust air bearings develop between said first and second herringbone groove pattern surfaces and said first and second surfaces of said outer cylinder.

2. The spindle assembly of claim 1, wherein said rotatable hub is made of aluminum and said outer cylinder is made of aluminum oxide ceramic.

3. The spindle assembly of claim 1, wherein said inner sleeve and said first and second end plates are made of aluminum oxide ceramic.

4. The spindle assembly of claim 1, wherein the several surfaces constituting said journal and thrust air bearings are configured and finished to ensure that, when said rotatable hub is stopped relative to said stationary shaft means, said touchdown speed is less than approximately 200 rpm.

5. The spindle assembly of claim 1, wherein the several surfaces constituting said journal and thrust air bearings are configured and finished to ensure random radial run-outs are less than approximately 2 microinches.

6. The spindle assembly of claim 1, further comprising motor means for rotating said hub means relative to said shaft means at a speed occurring in the range of from approximately 3000 rpm to approximately 6000 rpm.

7. The spindle assembly of claim 6, wherein said speed is approximately 3600 rpm.

8. The spindle assembly of claim 1, further comprising motor means for rotating said hub means relative to said shaft means.

9. The spindle assembly of claim 8, wherein said motor comprises rotor means secured to said hub means and stator means secured to said shaft means.

10. The spindle assembly of claim 9, wherein said rotor comprises a permanent magnet rotor.

11. The spindle assembly of claim 9, wherein said stator and rotor means operate as a direct current brushless motor.

12. The spindle assembly of claim 8, wherein said motor means is contained within the overall axial length of said interior volume of said hub means.

* * * * *